United States Patent
Setterberg et al.

(10) Patent No.: US 12,036,840 B2
(45) Date of Patent: Jul. 16, 2024

(54) CLIMATE SYSTEM IN A PASSENGER VEHICLE

(71) Applicant: Ningbo Geely Automobile Research & Development Co., Ltd., Ningbo (CN)

(72) Inventors: Johan Setterberg, Gothenburg (SE); Måns Pihlsgård, Gothenburg (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 661 days.

(21) Appl. No.: 17/194,219

(22) Filed: Mar. 6, 2021

(65) Prior Publication Data

US 2021/0188042 A1    Jun. 24, 2021

Related U.S. Application Data

(63) Continuation of application No. PCT/CN2019/103229, filed on Aug. 29, 2019.

(30) Foreign Application Priority Data

Sep. 14, 2018 (EP) ..................................... 18194598

(51) Int. Cl.
*B60H 1/00* (2006.01)

(52) U.S. Cl.
CPC ..... *B60H 1/00742* (2013.01); *B60H 1/00285* (2013.01); *B60H 1/00428* (2013.01);
(Continued)

(58) Field of Classification Search
CPC ............ B60H 1/00285; B60H 1/00428; B60H 1/00742; B60H 1/00778; B60H 1/00828; B60H 1/00849; B60H 1/00964
See application file for complete search history.

(56) References Cited

U.S. PATENT DOCUMENTS 5,361,593 A    11/1994  Dauvergne
5,878,809 A    3/1999   Heinle
(Continued)

FOREIGN PATENT DOCUMENTS

CN    103552441 A    2/2014
CN    106904141 A    6/2017
(Continued)

OTHER PUBLICATIONS

International Search Report from corresponding International Application No. PCT/CN2019/103229, mailed on Dec. 4, 2019, 3 pages.

*Primary Examiner* — Edelmira Bosques
*Assistant Examiner* — Michael James Giordano
(74) *Attorney, Agent, or Firm* — Tucker Ellis LLP

(57) ABSTRACT

A method for activating a climate system of a vehicle includes monitoring an operational state of the vehicle. Said monitoring is performed by a system controller incorporated into the vehicle, wherein the vehicle is on when said operational state corresponds to a first state, wherein the vehicle is off when said operational state corresponds to a second state. When said operational state corresponds to said second state, the method further includes asking the driver via an output interface if extended drive of climate system is desired, monitoring reply from driver on an input interface, if confirmation of extended drive of climate system is registered on the input interface, setting a timer for extended drive of the climate system, activating climate system for the vehicle, and deactivating the climate system at the time specified by the timer.

18 Claims, 2 Drawing Sheets

(52) U.S. Cl.
CPC ..... *B60H 1/00807* (2013.01); *B60H 1/00828* (2013.01); *B60H 1/00878* (2013.01); *B60H 1/00964* (2013.01)

(56) References Cited

U.S. PATENT DOCUMENTS

| | | | |
|---|---|---|---|
| 9,327,581 B2* | 5/2016 | Enke | B60H 1/00392 |
| 9,975,400 B2 | 5/2018 | Farooq | |
| 10,150,410 B2 | 12/2018 | Medenica | |
| 2002/0066281 A1 | 6/2002 | Gunasekera | |
| 2002/0161501 A1 | 10/2002 | Dulin | |
| 2003/0005712 A1* | 1/2003 | Lissner | B60H 1/00849 |
| | | | 236/49.3 |
| 2014/0371987 A1* | 12/2014 | Van Wiemeersch | B60K 35/00 |
| | | | 701/41 |
| 2017/0057322 A1 | 3/2017 | Kava | |
| 2017/0327125 A1 | 11/2017 | Nordbruch | |

FOREIGN PATENT DOCUMENTS

| | | | |
|---|---|---|---|
| DE | 10353505 A1 | | 6/2005 |
| JP | 59140117 A | | 8/1984 |
| KR | 20160058283 A | * | 11/2014 |

\* cited by examiner

CLIMATE SYSTEM IN A PASSENGER VEHICLE

RELATED APPLICATION DATA

This application is a continuation of International Patent Application No. PCT/CN2019/103229, filed Aug. 29, 2019, which claims the benefit of European Patent Application No. 18194598.1, filed Sep. 14, 2018, the disclosures of which are incorporated herein by reference in their entireties.

TECHNICAL FIELD

The present invention relates to a method for activating a climate system of a vehicle when the operational state of the vehicle off.

BACKGROUND

When a vehicle is turned off, the temperature in the car will eventually change. The change will occur faster the larger the difference between the temperature inside the vehicle and the temperature outside the vehicle. Even if there is no difference in temperature but the vehicle is in sunlight the vehicle is basically a greenhouse and the temperature will increase rapidly inside the vehicle when the A/C is turned off. It goes without saying that it is not safe for passengers or pets to remain in the vehicle but for a few minutes.

It is further not always possible to find a shaded parking and leaving the windows open might not be an option for various reasons, e.g. bad air quality, thieves etc.

One way to overcome the problem or at least extend the time where the temperature is kept at reasonable level is to have a heat shield to put especially at the windshield but also for the other windows. However, for short stops this is obviously not practical.

SUMMARY

It is an object of the present disclosure to provide a solution in order to be able to leave a vehicle for a shorter period of time and keep the climate in the vehicle irrespective of ambient temperature and solar radiation.

In the context of this disclosure the word vehicle used and is meant to cover cars, buses, and trucks, e.g. SUVs, MPVs, pick-up trucks, station wagons, haulers, and lorries.

According to a first aspect a method for activating a climate system of a vehicle is provided. The method comprises monitoring an operational state of the vehicle wherein said monitoring is performed by a system controller incorporated into the vehicle. The vehicle is on when said operational state corresponds to a first state and the vehicle is off when said operational state corresponds to a second state. When said operational state corresponds to said second state, the method further comprises asking the driver via an output interface if extended drive of climate system is desired, monitoring reply from driver on an input interface, if confirmation of extended drive of climate system is registered on the input interface, setting a timer for extended drive of the climate system, activating climate system for the vehicle, and deactivating the climate system at the time specified by the timer.

Thus, when the vehicle powertrain has been switched off, the driver is asked if extended drive of the climate system is desired. The extended drive could be set to last for anything from a few minutes and up depending on the requirements. For instance, a default time could be 15 minutes and if the driver returns to the car within 15 minutes and starts the vehicle, the climate system will return to a regular mode.

According to another aspect of the present disclosure, said output and input interface is a touch display. It is fairly intuitive to have a touch display showing the question and with buttons on the screen next to the question where extended drive could be confirmed or not, alternatively the question could be ignored. In the latter case, there are at least two options, one being that if ignored, there will be no extended drive of the climate system. A second option is instead to have an extended drive as default if the question is not answered. Further, as an alternative, the display could show buttons with various time options, for instance, 0, 5, 10, 15, and 30. Pressing 0 would then of course mean that there is no extended drive.

A further option is to have the output interface as a voice alert from a speaker and the input interface being a microphone and answering with a voice command. Still a further option is to have a combination, e.g. the output interface being a display with a question and the reply could be made by a voice command saying "yes".

According to a further aspect of the present disclosure the method comprises monitoring occupancy with at least one sensor connected to the system controller and wherein the climate system comprises at least one fan powered by an electric motor for providing an air flow in a duct and wherein at least one air nozzle is connected to the air duct for each seat of the vehicle, and decreasing the flow of air to the non-occupied parts of the vehicle compared to when the vehicle is on. Accordingly, less energy is used since the flow of air is concentrated to the occupied parts.

According to an alternative aspect of the present disclosure the method further comprises monitoring occupancy with at least one sensor connected to the system controller and wherein the climate system comprises at least one fan powered by an electric motor for providing an air flow in a duct and wherein at least one air nozzle is connected to the air duct for each seat of the vehicle, and increasing the flow of air to occupied parts of the vehicle compared to when the vehicle is on.

According to yet an alternative aspect of the present disclosure the method further comprises monitoring occupancy with at least one sensor connected to the system controller and wherein the climate system comprises at least one fan powered by an electric motor for providing an air flow in a duct and wherein at least one air nozzle is connected to the air duct for each seat of the vehicle, and controlling the flow of air such that it is higher for the occupied parts of the vehicle than for the non-occupied parts of the vehicle.

The system controller is according to an aspect of the present disclosure connected to a communication interface and the method further comprises monitoring input from the communication interface. In this way, the driver could extend the extended drive via an app on a smartphone or via some login function using the internet.

According to a further aspect of the present disclosure, the method further comprises monitoring the ambient temperature and the preset temperature for the climate system, and activating the recirculation when the difference between the ambient temperature and the preset temperature of the climate system is larger than 5 degrees Celsius.

If the difference between the ambient temperature and the preset temperature is large, then some energy could be saved by at least initially putting the climate system on recirculation such that no new air needs to be heated or cooled.

In accordance with yet another aspect of the present disclosure, the method comprises monitoring the temperature in the vehicle compartment and the preset temperature for the climate system, wherein the heater in the climate system is activated when the temperature in the vehicle compartment is lower than the preset temperature for the climate system.

In accordance with an alternative aspect of the present disclosure, the method comprises monitoring the temperature in the vehicle compartment and the preset temperature for the climate system, wherein the cooler in the climate system is activated when the temperature in the vehicle compartment is higher than the preset temperature for the climate system.

A climate system is provided for a passenger vehicle comprising at least one fan powered by an electric motor for providing an air flow in a duct and at least one air nozzle connected to the air duct for each seat of the vehicle. The system further comprises at least one sensor for determining what part of the vehicle is occupied and connected to a control system connected to the fan and arranged to control the air flow such that it is directed to the occupied parts of the vehicle. The system further comprises a timer arranged for extended drive of the climate system after the vehicle powertrain has been switched off.

By "directing" the air flow is meant that the air flow is controlled such that the main part of the air flow is directed towards the occupied parts. There are alternative solutions for this, e.g. that the air flow towards the non-occupied parts is decreased or completely stopped.

A further example could be to decrease the total air flow towards also the occupied parts but to shape flow to a more narrow or focused stream of air.

According to one aspect of the disclosure a button will appear on the screen when the driver stops the vehicle asking if the climate should be kept for a predetermined time, for instance, 20 minutes. The time is easily changeable and could also be adjustable using an app with a specific setting for the above.

If the above function is chosen by the driver, the vehicle keeps the temperature by heating or cooling the car. When activated the car will optionally seal off the fresh air flaps in order to minimize the amount of air that needs to be heated or cooled, i.e. recirculation. The sensor helps to detect if there are passengers or pets left and where they sit and will optimize the airflow for the occupants.

An alternative is of course to generally keep the temperature in the vehicle without there being anyone left in the vehicle.

If the driver gets back to the vehicle and starts it before time is up on the timer, the climate system goes back to normal operation and the extended operation mode is thus deactivated.

According to a further aspect of the present disclosure the climate system comprises one fan for each air nozzle. In some cases it might be easier to control the flow of air with separate fans for each nozzle instead of a manifold system with valves to be controlled.

For more efficient controlling of the climate, the climate system comprises an ambient temperature sensor connected to the control system and at least one temperature sensor in the vehicle connected to the control system.

According to one alternative aspect of the present disclosure, the temperature sensor in the vehicle is arranged in the vehicle compartment.

A more advanced climate system according to the present disclosure comprises a temperature sensor arranged upstream in the duct of each air nozzle and each connected to the control system. This allows for a more precise controlling of the temperature.

In accordance with one aspect of the present disclosure the climate system utilizes a camera as the sensor. In accordance with an alternative version, the sensor is a capacitive displacement sensor.

As mentioned previously, the system could according to one aspect of the present disclosure be arranged to switch to recirculation of the air when the vehicle powertrain is switched off. For many scenarios this will help minimize the use of energy for heating or cooling the air if the difference between ambient air temperature and the temperature in the vehicle compartment is significant. Depending on the time the timer is set for running, it might be necessary to have some air exchange with the "outside" to get rid of the carbon dioxide, the level of which will increase if there are occupants left in the vehicle.

For facilitating the control of the climate system or alternatively controlling it remotely, the climate system in accordance with another aspect of the present disclosure comprises a control system that is arranged with internet connection such that the climate system is connected to an app interface on a smartphone or tablet.

An example of when this function could be useful is if the driver having left the vehicle realizes that the stop might be longer than initially expected and then, with for instance an app in a smartphone, the driver can easily extend the running time of the climate system. Alternatively, if the vehicle is left with no one in it, the climate system could be stopped and instead the pre-acclimatization could be programmed to start later on.

For the occasions when a pet like for instance a dog or a cat is transported the climate system according to yet another aspect of the present disclosure comprises an air nozzle in the luggage compartment. Depending on the design of the vehicle it could be necessary to have a sensor in the luggage compartment.

Thus, according to the climate system of the present disclosure the driver transporting for instance a dog could without worrying about the health of the dog leave it in the vehicle while making a short stop for whatever reason.

The outlets/air nozzles can direct air by aiming or directing air towards an occupant or occupants and change air velocity. An example of the system could use four actuators for each vent outlet, controlling x-axis, y-axis, "air distribution cone"-shape and one actuator closing the vent. The shape of the "air cone" determines the velocity of the air and the spread. The effect of the outlets/air nozzles directing air only to occupied parts of the vehicle allows the climate system to reduce energy usage and to work more efficiently with regards to subjective feel of the climate for the remaining occupants. The average temperature in the vehicle may drop or go above the target temp, but the occupant-zones will remain comfortable since air is directed to those zones.

Further features of, and advantages with, the present invention will become apparent when studying the appended claims and the following description. The skilled person realize that different features of the present invention may be combined to create embodiments other than those described in the following, without departing from the scope of the present invention.

In the examples above the driver is the one leaving the vehicle, however, it goes without saying that there might as well be a passenger temporarily leaving the vehicle and the driver will stay behind in the vehicle.

BRIEF DESCRIPTION OF THE DRAWINGS

The above, as well as additional objects, features and advantages of the present invention, will be better understood through the following illustrative and non-limiting detailed description of an exemplary embodiment of the present invention, wherein.

DETAILED DESCRIPTION

Figure 1:
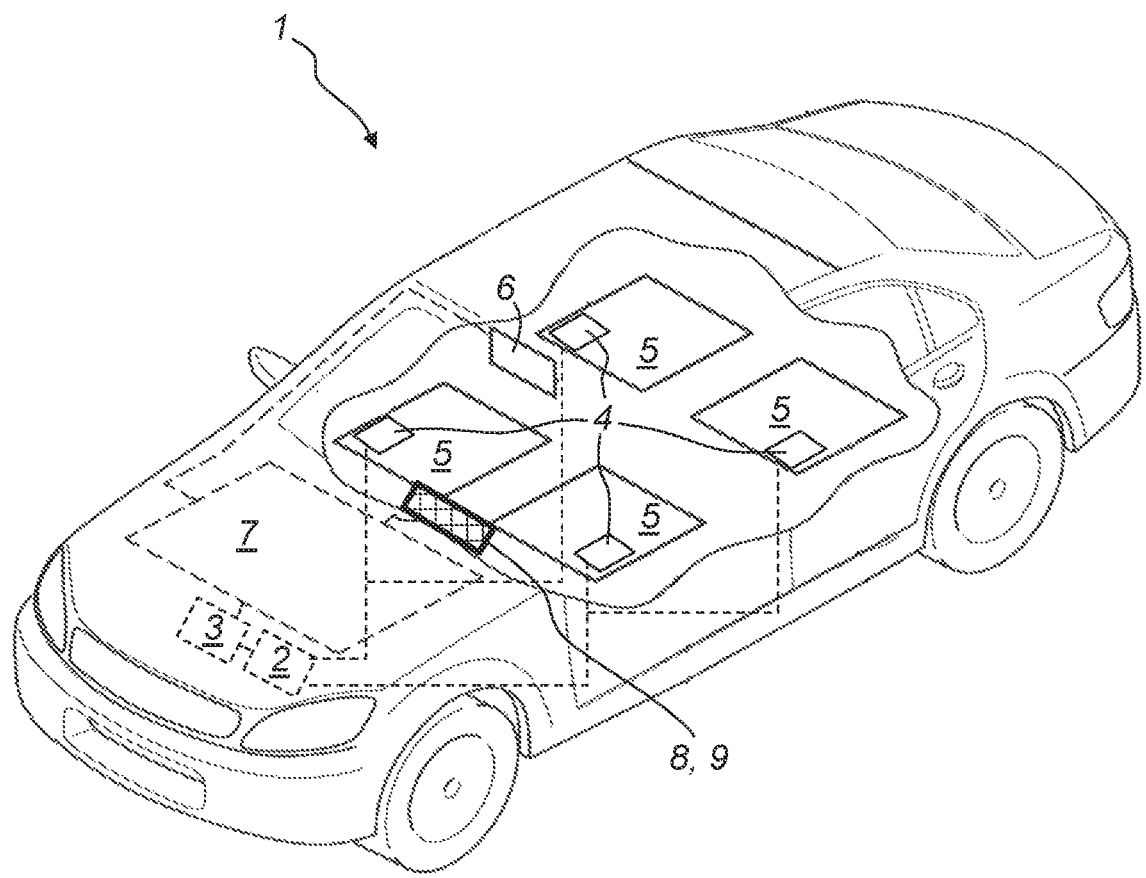
FIG. 1 is a schematic view of a vehicle with a system for performing the method of the present disclosure.

The present invention will now be described more fully hereinafter with reference to the accompanying drawings, in which an exemplary embodiment of the invention is shown. The invention may, however, be embodied in many different forms and should not be construed as limited to the embodiments set forth herein; rather, this embodiment is provided for thoroughness and completeness. Like reference character refer to like elements throughout the description.

With reference to FIG. 1, a climate system for a passenger vehicle 1 comprises one fan 2 powered by an electric motor 3 for providing an air flow in a duct and one air nozzle 4 connected to the air duct for each seat 5 of the vehicle 1.

The system further comprises one sensor 6 for determining what part of the vehicle 1 is occupied and connected to a system controller 7 connected to the fan 2 and arranged to control the air flow such that it is directed to the occupied parts of the vehicle 1.

As shown in the drawing, the output and input interfaces 8, 9 are combined in one touch display.

As an alternative the climate system comprises one fan for each air nozzle.

The sensor 6 could for instance be a camera. However, for some situations the use of a capacitive displacement sensor could be beneficial. For instance, if a passenger is sleeping, a camera detecting motions to identify an occupant of the vehicle, the sleeping passenger might not be detected.

Figure 2:
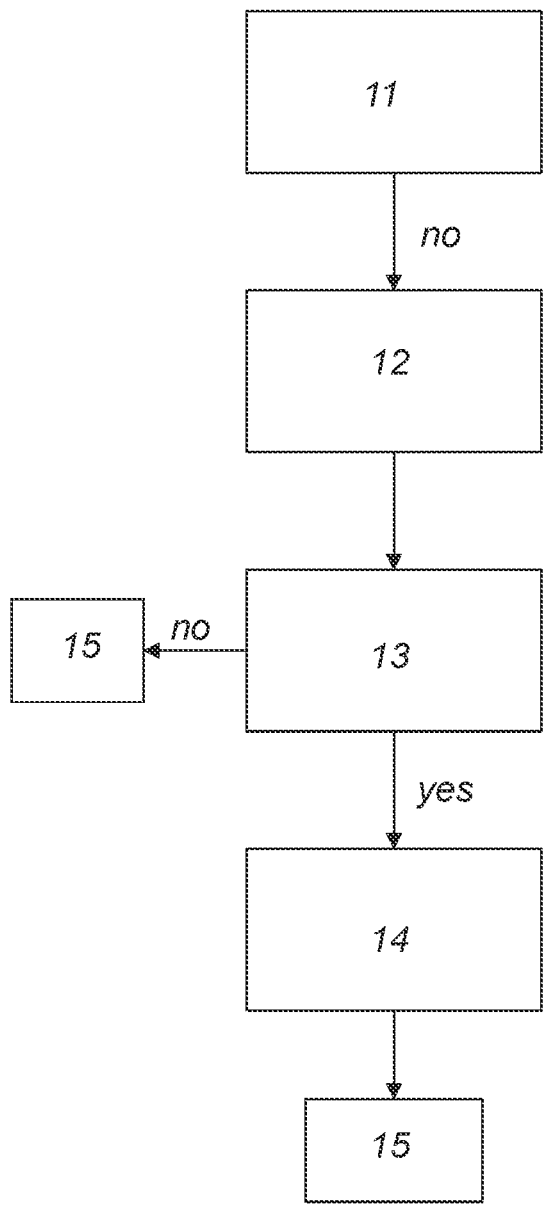
FIG. 2 is a flow chart of the method according to the present disclosure.

In FIG. 2 a flow chart is shown. When the status of the vehicle is on 11, i.e. as long as the vehicle powertrain is on, the method of the present disclosure is on standby. When the status switches to off, the touch display shows 12 the question regarding extended drive of the climate system to the driver. The input from the driver is monitored 13 and if the driver does not want to have an extended drive of the climate system the system controller switches off 15. If extended drive is desired then the timer is started together with the climate system 14. After the specified amount of time in the timer is out or if the vehicle status is switched to on, the system controller switches off 15.

It is to be understood that the present invention is not limited to the embodiments described above and illustrated in the drawings; rather, the skilled person will recognize that many changes and modifications may be made within the scope of the appended claims. For example, the vehicle shown in FIG. 1 is a sedan vehicle but climate system as disclosed could be utilized in any kind of passenger vehicle.

What is claimed is:

1. A method for activating a climate system of a vehicle to keep a climate in the vehicle during a time that a driver of the vehicle has left the vehicle irrespective of ambient temperature and solar radiation, the method comprising:

monitoring an operational state of the vehicle and detecting that the operational state has switched from an on state to an off state, wherein the monitoring and detecting are performed by a system controller incorporated into the vehicle, prompting the driver, via an output interface, for a user input that indicates that extended drive mode of the climate system is desired by the driver;

monitoring an input interface for the user input and, in response to detecting the user input, setting a timer for extended drive of the climate system during a period of time;

operating the climate system for the vehicle to keep the climate in the vehicle irrespective of ambient temperature and solar radiation during the period of time of the timer; and detecting that the driver enters to the vehicle and starts the vehicle before the period of the timer expires and, in response, deactivating the extended drive mode of the climate system so that the climate system enters a normal operational mode of the climate system.

2. The method according to claim 1, wherein said output interface and input interface are incorporated in a touch display.

3. The method according to claim 1, further comprising, in the extended drive mode, monitoring occupancy with at least one sensor connected to the system controller, the climate system comprising at least one fan powered by an electric motor for providing an air flow in a duct, at least one air nozzle connected to the air duct for each seat of the vehicle, and decreasing the flow of air to non-occupied seats of the vehicle compared to when the vehicle is in the on state.

4. The method according to claim 1, further comprising, in the extended drive mode, monitoring occupancy with at least one sensor connected to the system controller, the climate system comprising at least one fan powered by an electric motor for providing an air flow in a duct, at least one air nozzle connected to the air duct for each seat of the vehicle, and increasing the flow of air to occupied seats of the vehicle compared to when the vehicle is in the on state.

5. The method according to claim 1, further comprising, in the extended drive mode, monitoring occupancy with at least one sensor connected to the system controller, the climate system comprising at least one fan powered by an electric motor for providing an air flow in a duct, at least one air nozzle connected to the air duct for each seat of the vehicle, and controlling the flow of air such that the air flow is higher for the occupied seats of the vehicle than for the non-occupied seats of the vehicle.

6. The method according to claim 1, further comprising receiving, by the system controller and from a remote smartphone or tablet, input to adjust the time period of the timer.

7. The method according to claim 1, further comprising monitoring ambient temperature of the vehicle and a preset temperature for the climate system, detecting that a difference between the ambient temperature and the preset temperature of the climate system is larger than 5 degrees Celsius and, in response, activating recirculation of air flow within the vehicle.

8. The method according to claim 1, comprising monitoring a temperature in the vehicle compartment and a preset temperature for the climate system, detecting that the temperature in the vehicle compartment is lower than the preset temperature for the climate system and, in response, activating a heater in the climate system.

9. The method according to claim 1, comprising monitoring a temperature in the vehicle compartment and a preset temperature for the climate system, wherein a cooler in the climate system is activated upon detecting that the temperature in the vehicle compartment is higher than the preset temperature for the climate system.

10. A method for activating a climate system of a vehicle to keep a climate in the vehicle during a time that a driver of the vehicle has left the vehicle irrespective of ambient temperature and solar radiation, the method comprising:
  monitoring an operational state of the vehicle and detecting that the operational state has switched from an on state to an off state, wherein the monitoring and detecting are performed by a system controller incorporated into the vehicle,
  prompting the driver, via an output interface, for a user input that indicates that extended drive mode of the climate system is desired by the driver;
  monitoring an input interface for the user input and, in response to detecting the user input, setting a timer for extended drive of the climate system during a period of time;
  operating the climate system for the vehicle to keep the climate in the vehicle irrespective of ambient temperature and solar radiation during the period of time of the timer; and
  detecting that the driver does not enter the vehicle and start the vehicle before the period of time of the timer expires and, in response, deactivating the climate system.

11. The method according to claim 10, wherein said output interface and input interface are incorporated in a touch display.

12. The method according to claim 10, further comprising, in the extended drive mode, monitoring occupancy with at least one sensor connected to the system controller, the climate system comprising at least one fan powered by an electric motor for providing an air flow in a duct, at least one air nozzle connected to the air duct for each seat of the vehicle, and decreasing the flow of air to non-occupied seats of the vehicle compared to when the vehicle is in the on state.

13. The method according to claim 10, further comprising, in the extended drive mode, monitoring occupancy with at least one sensor connected to the system controller, the climate system comprising at least one fan powered by an electric motor for providing an air flow in a duct, at least one air nozzle connected to the air duct for each seat of the vehicle, and increasing the flow of air to occupied seats of the vehicle compared to when the vehicle is in the on state.

14. The method according to claim 10, further comprising, in the extended drive mode, monitoring occupancy with at least one sensor connected to the system controller, the climate system comprising at least one fan powered by an electric motor for providing an air flow in a duct, at least one air nozzle connected to the air duct for each seat of the vehicle, and controlling the flow of air such that the air flow is higher for the occupied seats of the vehicle than for the non-occupied seats of the vehicle.

15. The method according to claim 10, further comprising receiving, by the system controller and from a remote smartphone or tablet, input to adjust the time period of the timer.

16. The method according to claim 10, further comprising monitoring ambient temperature of the vehicle and a preset temperature for the climate system, detecting that a difference between the ambient temperature and the preset temperature of the climate system is larger than 5 degrees Celsius and, in response, activating recirculation of air flow within the vehicle.

17. The method according to claim 10, comprising monitoring a temperature in the vehicle compartment and a preset temperature for the climate system, detecting that the temperature in the vehicle compartment is lower than the preset temperature for the climate system and, in response, activating a heater in the climate system.

18. The method according to claim 10, comprising monitoring a temperature in the vehicle compartment and a preset temperature for the climate system, wherein a cooler in the climate system is activated upon detecting that the temperature in the vehicle compartment is higher than the preset temperature for the climate system.

* * * * *